United States Patent
McIntosh

(10) Patent No.: US 12,458,820 B2
(45) Date of Patent: Nov. 4, 2025

(54) FIRE-SUPPRESSING PAPER DISPENSING SYSTEMS AND METHODS

(71) Applicant: THE BOEING COMPANY, Arlington, VA (US)

(72) Inventor: Darren Carl McIntosh, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 307 days.

(21) Appl. No.: 18/357,351

(22) Filed: Jul. 24, 2023

(65) Prior Publication Data

US 2025/0032829 A1  Jan. 30, 2025

(51) Int. Cl.
| | | |
|---|---|---|
| A62C 2/06 | (2006.01) | |
| A47K 10/38 | (2006.01) | |
| A62C 3/08 | (2006.01) | |
| B64D 11/02 | (2006.01) | |
| A47K 10/32 | (2006.01) | |

(52) U.S. Cl.
CPC .............. *A62C 2/065* (2013.01); *A47K 10/38* (2013.01); *A62C 3/08* (2013.01); *B64D 11/02* (2013.01); *A47K 2010/3233* (2013.01)

(58) Field of Classification Search
CPC .................... A62C 2/06; A62C 2/065
USPC .................... 169/46, 48, 54, 56, 62
See application file for complete search history.

(56) References Cited

U.S. PATENT DOCUMENTS

| | | | | |
|---|---|---|---|---|
| 5,125,548 | A | * | 6/1992 | Perrin ................ A47K 10/3637 169/48 |
| 7,331,401 | B2 | * | 2/2008 | Bobenhausen ........ B64D 11/02 169/62 |
| 7,506,478 | B2 | * | 3/2009 | Bobenhausen ........ B64D 25/00 52/232 |
| 10,485,388 | B1 | | 11/2019 | McIntosh |
| 10,898,035 | B2 | | 1/2021 | McIntosh |
| 10,898,036 | B2 | | 1/2021 | McIntosh |
| 11,270,254 | B2 | | 3/2022 | McIntosh |
| 2022/0401766 | A1 | | 12/2022 | McIntosh |
| 2022/0401769 | A1 | | 12/2022 | Mcintosh |

* cited by examiner

*Primary Examiner* — Steven J Ganey
(74) *Attorney, Agent, or Firm* — Joseph M. Butscher; The Small Patent LAw Group LLC

(57) ABSTRACT

A paper dispensing system and method include one or more housings defining an internal chamber configured to retain a roll of wound paper. The one or more housings includes internal surfaces, and an opening through which an edge of the wound paper is dispensable. An intumescent material is coupled to the one or more housings. The intumescent material is configured to expand to fill and close open areas including the opening within the one or more housings in response to being exposed to a predetermined temperature.

20 Claims, 4 Drawing Sheets

FIRE-SUPPRESSING PAPER DISPENSING SYSTEMS AND METHODS

FIELD OF THE DISCLOSURE

Examples of the present disclosure generally relate to fire-suppressing paper dispensing systems and methods within a lavatory, a galley, or the like of an internal cabin of a vehicle.

BACKGROUND OF THE DISCLOSURE

Commercial aircraft are used to transport passengers between various locations. A typical commercial aircraft includes one or more lavatories, one or more galleys, and the like within an internal cabin.

Paper dispensers may be located throughout an internal cabin of an aircraft. For example, a lavatory within the internal cabin includes a toilet paper dispenser, and a hand towel dispenser. As another example, a galley within the internal cabin includes a hand towel dispenser.

Certain paper towel dispensers contain one or more relatively large paper towel rolls of paper that provide a substantial amount of potential fuel to propagate a fire, which is considered when installing such a dispenser on an aircraft in order to meet stringent fire containment requirements for airplane certification (such as promulgated by the United States Federal Aviation Administration (FAA). In a potential scenario, an individual with nefarious intent could light an exposed bottom edge of a dispensed paper towel, which could then burn upwards to the paper towel roll(s), thereby igniting it and creating a dangerous condition.

SUMMARY OF THE DISCLOSURE

A need exists for a system and method for effectively and efficiently suppressing fire within a paper dispenser. Further, a need exists for a fire-suppressing paper dispensing system that meets various fire containment requirements within a commercial aircraft.

With those needs in mind, certain examples of the present disclosure provide a paper dispensing system including one or more housings defining an internal chamber configured to retain a roll of wound paper. The one or more housings includes internal surfaces, and an opening through which an edge of the wound paper is dispensable. An intumescent material is coupled to the one or more housings. The intumescent material is configured to expand to fill and close open areas including the opening within the one or more housings in response to being exposed to a predetermined temperature.

In at least one example, the intumescent material covers at least a portion of the internal surfaces. In at least one further example, the intumescent material covers an entirety of the internal surfaces.

The paper dispensing system can be disposed within an internal cabin of a vehicle. For example, the paper dispensing system can be within a lavatory or a galley of the internal cabin.

The wound paper can be configured to be manually dispensed. Optionally, the wound paper can be configured to be automatically dispensed.

The one or more housings can include a base, one or more walls extending from the base, and a door moveably coupled to the one or more walls. The door is moveable between a closed position, and an open position. The intumescent material is coupled to the base, the one or more walls, and the door.

In at least one example, the intumescent material coats the internal surfaces of the one or more housings. In at least one example, the one or more housings is integrally formed with the intumescent material.

The one or more housings can include two or more housings. The paper dispensing system can also include a cabinet. The two or more housings can be disposed within the cabinet.

Certain example of the present disclosure provide a vehicle including an internal cabin, and a paper dispensing system disposed within the internal cabin, as described herein.

Certain examples of the present disclosure provide a paper dispensing method including coupling an intumescent material to one or more housings defining an internal chamber configured to retain a roll of wound paper, wherein the one or more housings comprises internal surfaces, and an opening through which an edge of the wound paper is dispensable, and wherein the intumescent material is configured to expand to fill and close open areas including the opening within the one or more housings in response to being exposed to a predetermined temperature.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain examples of the present disclosure provide a paper dispensing system configured to suppress fire therein. The paper dispensing system is configured to suppress a fire in a scenario in which an individual attempts to nefariously light a bottom edge of dispensed paper. In this scenario, the heat from the initial fire activates an intumescent coating within the paper dispensing system. The intumescent coating chars, swells, and expands to close out air gaps, thereby self-extinguishing any fire due to a lack of oxygen within the paper dispensing system.

Figure 1:
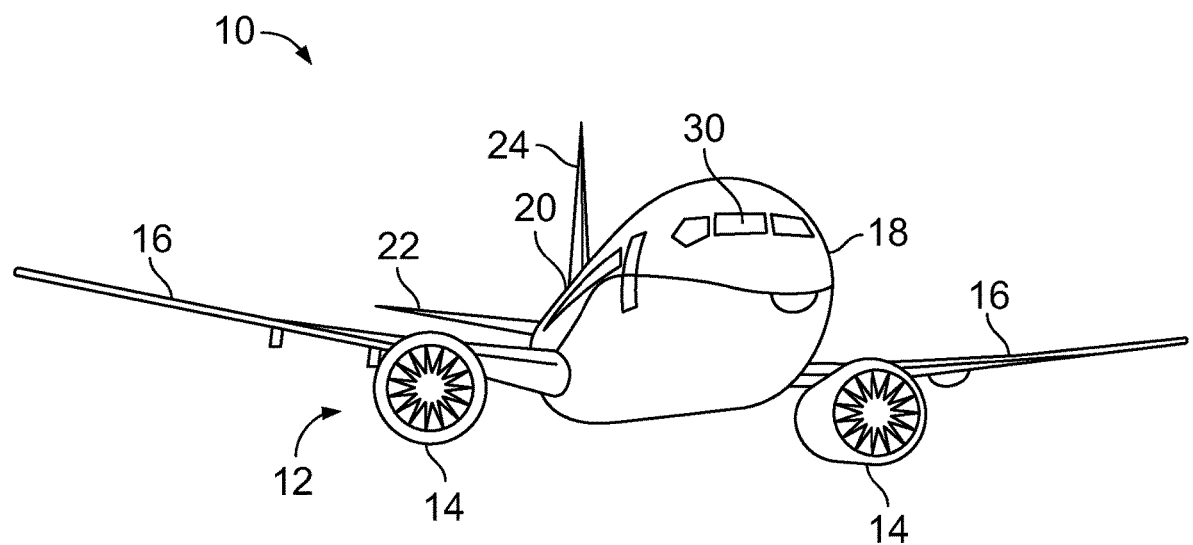
FIG. 1 illustrates a perspective front view of an aircraft, according to an example of the present disclosure.

FIG. 1 illustrates a perspective front view of an aircraft 10, according to an example of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other examples, the engines 14 may be carried by a fuselage 18 and/or an empennage 20. The empennage 20 may also support horizontal stabilizers 22 and a vertical stabilizer 24. The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, examples of the present disclosure may be used with various other vehicles, such as automobiles, buses, locomotives and train cars, cruise ships, watercraft, spacecraft, and the like. Further, examples of the present disclosure may be used with respect to fixed structures, such as commercial and residential buildings, and/or public restrooms.

Figure 2:
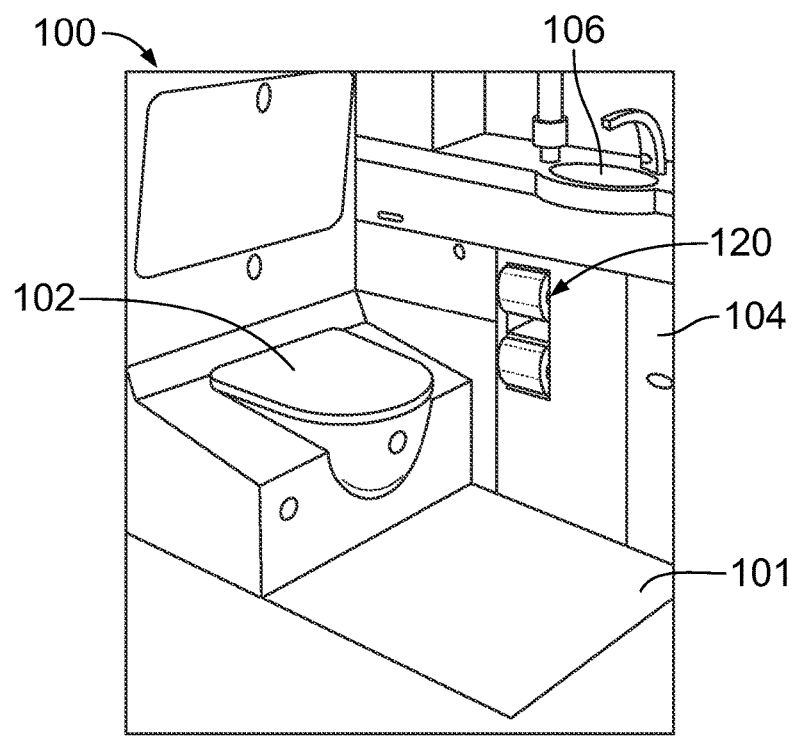
FIG. 2 illustrates a perspective internal view of a lavatory, according to an example of the present disclosure.

FIG. 2 illustrates a perspective internal view of a lavatory 100, according to an example of the present disclosure. The lavatory 100 is an example of an enclosed component, such as within the internal cabin of the aircraft 10, shown in FIG. 1. The lavatory 100 may be onboard an aircraft, as described above. Optionally, the lavatory 100 may be onboard various other vehicles. In other examples, the lavatory 100 may be within a fixed structure, such as a commercial or residential building. The lavatory 100 includes a base floor 101 that supports a toilet 102, cabinets 104, and a sink 106 or wash basin. The lavatory 100 may be arranged differently than shown. The lavatory 100 may include more or less components than shown.

The lavatory 100 includes one or more paper dispensing systems 120. For example, a paper dispensing system 120 can be configured to dispense toilet paper. As another example, a paper dispensing system 200 can be configured to dispense paper towels, such as can be used to dry hands.

The paper dispensing systems 120 can be manually operated, or automatically operated. For example, the paper dispensing systems 120 can be configured to allow an individual to pull and grasp paper therefrom. As another example, the paper dispensing systems 120 can include a sensor configured to detect a hand in close proximity, and an actuator configured to automatically dispense paper in response to the sensor detecting the hand, known as on demand mode. Alternatively, paper can be automatically dispensed at a pre-determined length without a hand sensor, known as hanging towel mode, in which paper is dispensed immediately after the paper towel is torn.

Figure 3:
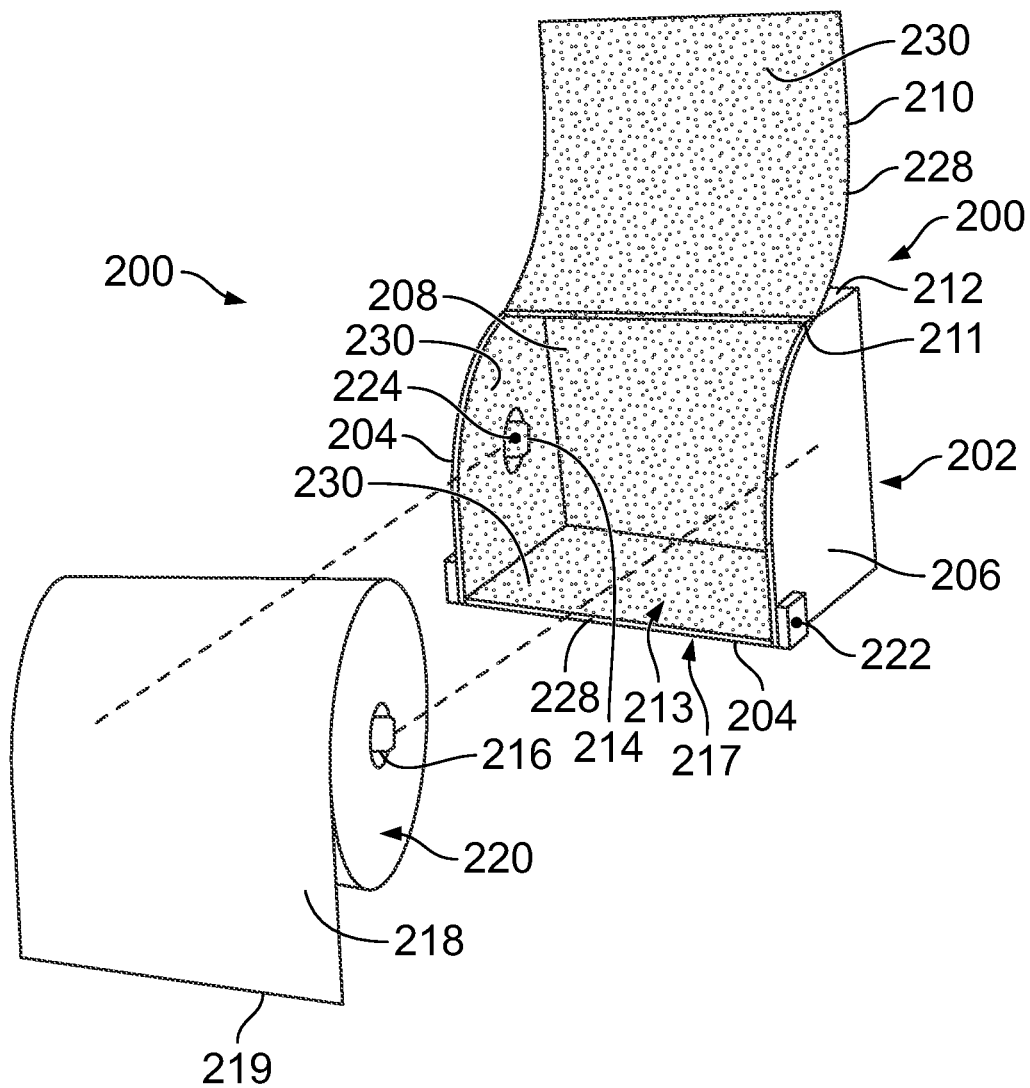
FIG. 3 illustrates an isometric front view of a paper dispensing system, according to an example of the present disclosure.

FIG. 3 illustrates an isometric front view of a paper dispensing system 200, according to an example of the present disclosure. The paper dispensing system 200 includes a housing 202 having a base 204, lateral walls 206 extending upwardly from a base 204, a rear wall 208 extending upwardly from the base 204, and door 210 moveably secured to one or more of the rear wall 208 and/or the lateral walls 206. In at least one example, the door 210 moveably couples to an upper edge of the rear wall and/or a top wall 212 via a hinge 211. The door 210 is configured to be moved between an open position (as shown in FIG. 3) to expose an internal chamber 213, and a closed position, in which the internal chamber 213 is closed.

Optionally, the housing 202 may not include a movable door. Instead, a passage can be formed in the housing 202 that allows paper to be inserted and removed.

The housing 202 provides a casing that closely fits a roll 216 of paper 218. The housing 202 further includes an opening 217 formed in the base 204. The opening 217 allows a bottom edge 219 of the paper 218 to be fed therethrough.

Optionally, the housing 202 may include more or less walls. Further, the housing 202 may include walls that are shaped differently than shown. As an example, a single curved outer wall may connect to the base 204.

The housing 202 also includes one or more roll engagers 214 that are configured to removably couple to the roll 216 of wound paper 218. The paper 218 winds around the roll 216. The roll engagers 214 can be pins, posts, clips, nubs, rods, cylinders, and/or the like. The roll engagers 214 can be spring-biased.

The paper 218 can be toilet paper, for example. As another example, the paper 218 can be paper towels. As another example, the paper 218 can be napkins.

The paper dispensing system 200 can be a manual system, in which an individual grasps a bottom edge 219 of the paper and pulls it to remove a portion of the paper from the main wound body 220. As another example, the paper dispensing system 200 can be configured to automatically dispense the paper 218. In such an example, the paper dispensing system 200 can include one or more sensors 222 configured to detect an object in a predetermined proximity (such as within 6 inches or less). An actuator 224, such as a rotary motor, can be operatively coupled to the roll engagers 214. In operation, when the sensor(s) 222 detect a presence of the object (such as a hand) within the predetermined proximity, the actuator 224 operates to unroll the main wound body 220 to automatically dispense paper therefrom, known as on demand mode. Alternatively, paper can be automatically dispensed at a pred-determined length without a hand sensor, known as handing towel mode, in which paper is dispensed immediately after the paper towel is torn. Optionally, the papers dispensing system 200 may not include the sensor(s) 222 or the actuator 224.

In order to suppress any fire that could potentially be started by the paper 218 being ignited, internal surfaces 228 of the housing 202 include an intumescent material 230. For example, the internal surfaces 228 can be coated with the intumescent material 230. As another example, the internal surfaces 228 can be integrally formed with the intumescent material 230. As an example, each of the structural components of the housing 202 can be integrally formed with the intumescent material 230.

In at least one example, an entirety of the internal surfaces 228 of the housing 202 within the internal chamber 213 includes the intumescent material 230. In particular, internal surfaces 228 of each of the base 204, the lateral walls 206, the rear wall 208, the door 210, and the like are coated with the intumescent material 230. The intumescent material 230 is configured to expand when exposed to a predetermined set temperature, such as 50-100 degrees Celsius or higher. If the temperature does not reach the predetermined temperature, the intumescent material 230 is inert. If, however, the predetermined temperature is reached, the intumescent material 230 expands. As the intumescent material 230 expands, the expansion fills open areas, such as inner voids, gaps, spaces, openings, and/or the like of the housing 202. Due to lack of oxygen, any fire within the housing 202 self-extinguishes.

In at least one example, the intumescent material 230 is a coating that is inert at low temperatures (such as below the activation threshold of 50-100 degrees Celsius), but reacts in response to increased heat (typically at temperatures of 50-100 degrees Celsius or higher). As the temperature increases, such as during a fire, the intumescent material 230 swells and forms a char layer that covers internal surfaces 228.

In at least one example, the housing 202 is formed of one or more metals, and the intumescent material 230 coats the internal surfaces 228 of the metallic structures. In at least one example, the intumescent material 230 covers an entirety of the internal surfaces 228 of the housing 202.

Figure 4:
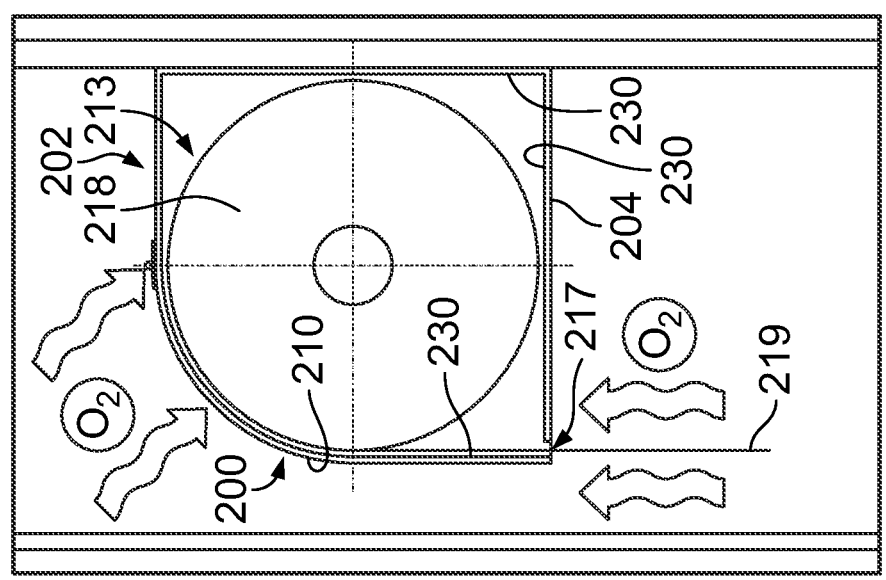
FIG. 4 illustrates an internal lateral view of the paper dispensing system during normal operation, according to an example of the present disclosure.

FIG. 4 illustrates an internal lateral view of the paper dispensing system 200 during normal operation, according to an example of the present disclosure. As shown, the bottom edge 219 of the paper 218 extends downwardly and outwardly through the opening 217. The paper 218 is stowed within the internal chamber 213, and can be dispensed out of the opening 217.

Figure 5:
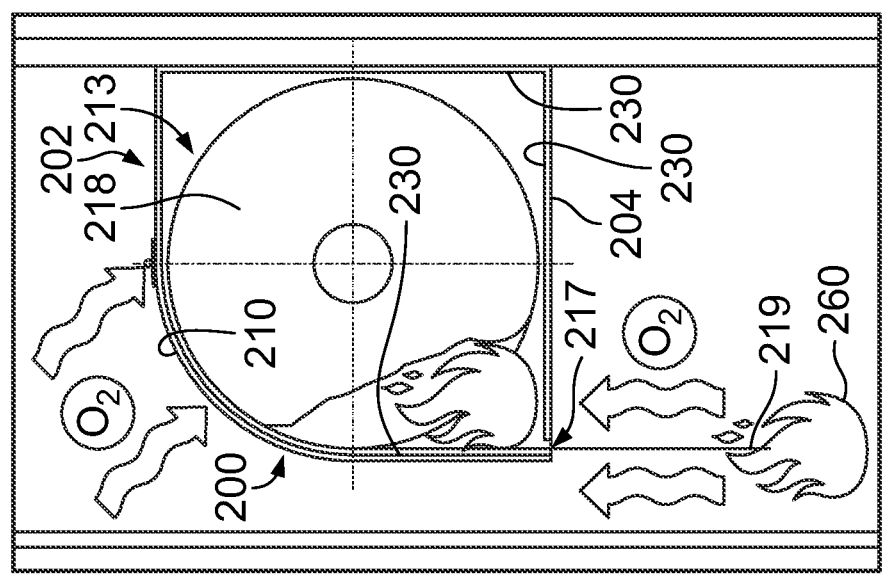
FIG. 5 illustrates an internal lateral view of the paper dispensing system as paper is ignited, according to an example of the present disclosure.

FIG. 5 illustrates an internal lateral view of the paper dispensing system 200 as the paper 218 is ignited, according to an example of the present disclosure. The bottom edge 219 may be ignited by an individual with nefarious intent. The ensuing flame 260 travels up into the internal chamber 213, which may then ignite the wound paper 218, thereby causing the temperature to increase.

Figure 6:
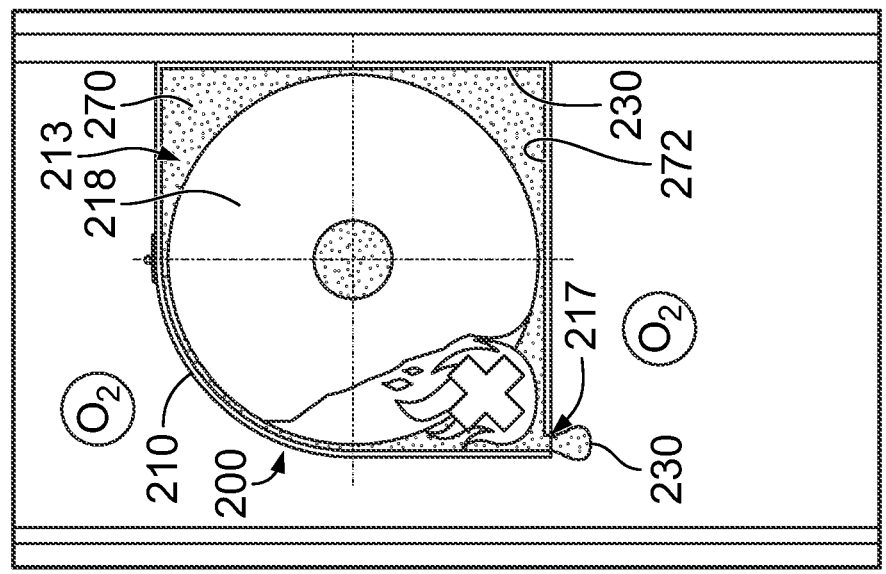
FIG. 6 illustrates an internal lateral view of the paper dispensing system with an intumescent material in an expanded state, according to an example of the present disclosure.

FIG. 6 illustrates an internal lateral view of the paper dispensing system 200 with the intumescent material 230 in an expanded state 270, according to an example of the present disclosure. As the temperature within the internal chamber 213 increases to a predetermined temperature, the intumescent material 230 expands, thereby filling all voids, holes, and the like within the housing 202. For example, the intumescent material 230 expands into and through the opening 217, thereby providing an air-tight internal barrier 272 within the housing 202. The air-tight internal barrier 272 prevents air from passing into the internal chamber 213, thereby depriving any fire of oxygen, and extinguishing any flame within the internal chamber 213.

Referring to FIGS. 1-6, the paper dispensing system 200 includes the housing 202, which provides a fire containment casing that is configured to retain a roll of wound paper 218 (or optionally multiple rolls of wound paper 218). The housing 202 can be entirely or partially formed of one or more metals. Intumescent material 230 covers the internal surfaces 228 of the housing 202. When the door 210 is in the closed position, the housing 202 closely fits parameters of a new paper towel roll(s), minimizing air gaps around the paper towel roll, while allowing enough clearance for the paper towel roll(s) to unroll and dispense freely.

The intumescent material 230 may cover an entirety of the internal surfaces 228 of the housing 202. Optionally, the intumescent material 230 may cover less than the entirety of the internal surfaces 228.

The door 210 is configured to move between the closed position, and the open position (such as via one or more hinges) to allow for replacement of paper 218. Like the base 204 and walls 206, 208, internal surfaces 228 of the door 210 (that is, the surfaces facing the internal chamber 213 when the door 210 is closed) are covered with the intumescent material 230. The housing 202 can also include a latch that is configured to securely close the door 210 in the closed position.

The paper dispensing system 200 can be used in various areas of the internal cabin of an aircraft, such as within a lavatory, galley, bar area, crew rest area, flight deck. Optionally, the paper dispensing system 200 can be used in areas of various other types of vehicles, residential or commercial buildings, public restrooms, and/or the like.

As described herein, the paper dispensing system 200 includes one or more housings, such as the housing 202 defining the internal chamber 213 configured to retain a roll 216 of wound paper 218. The housing includes the internal surfaces 228, and the opening 217 through which an edge (such as the bottom edge 219) of the wound paper 218 is dispensed. The intumescent material 230 is coupled to the housing 202. The intumescent material 230 is configured to expand to fill voids (such as the opening 217) within the housing 202 in response to being exposed to a predetermined temperature. In at least one example, the intumescent material 230 covers at least a portion of the internal surfaces 228. In at least one further example, the intumescent material 230 covers an entirety of the internal surfaces 228.

Figure 7:
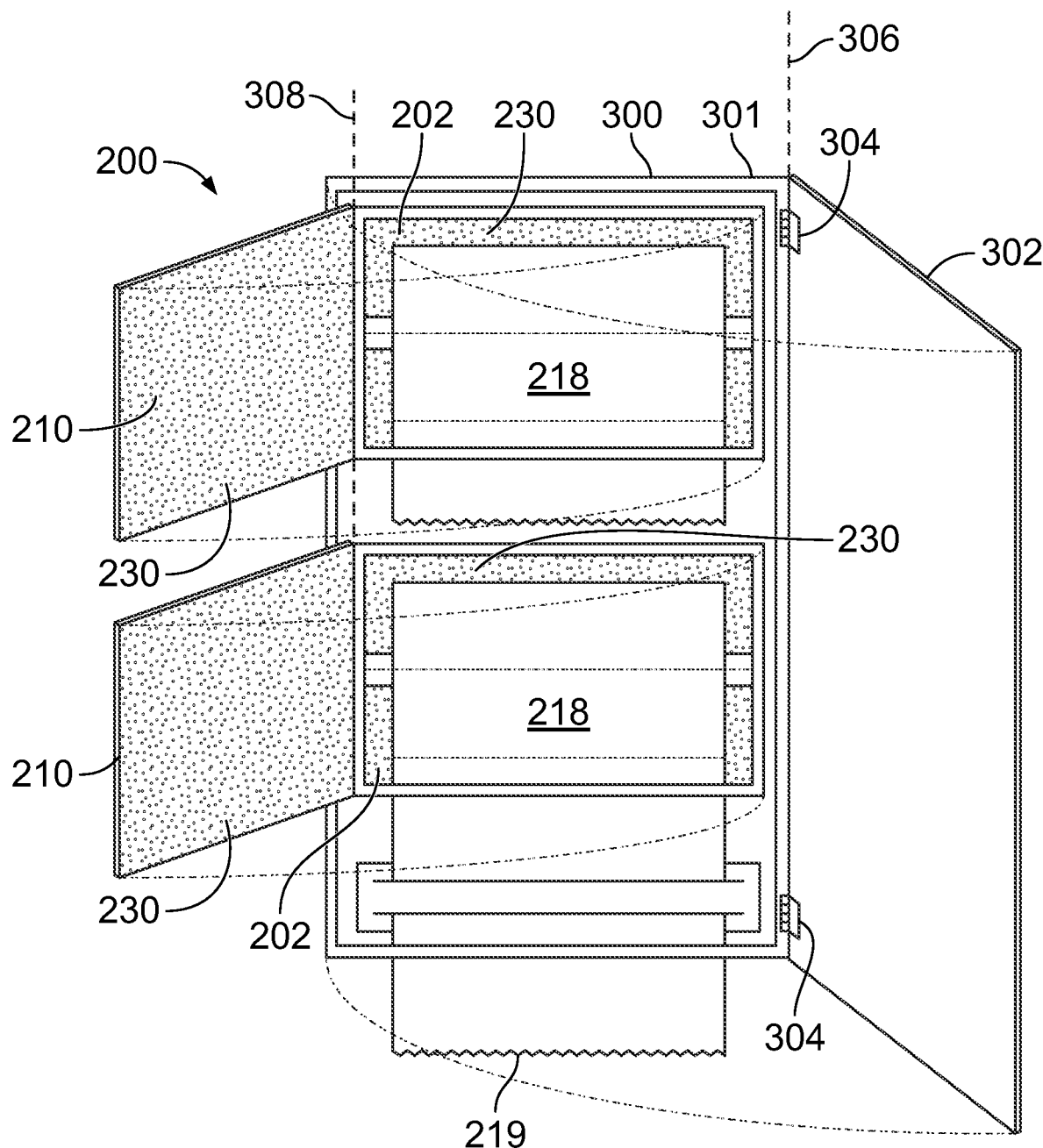
FIG. 7 illustrates a front view of a paper dispensing system, according to an example of the present disclosure.

FIG. 7 illustrates a front view of a paper dispensing system 200, according to an example of the present disclosure. In this example, the paper dispensing system 200 includes a cabinet 300 having a main body 301, and a door 302 moveably coupled to the main body 301, such as via one or more hinges 304. The door 302 is configured to pivot between open and closed positions about vertical axis 306.

Housings 202 are disposed within the cabinet 300. The housings 202 are configured to retain paper 218, as described above. The housings 202 can include doors 210 that are configured to pivot open about a vertical axis 308, which can be parallel to the vertical axis 306. Internal surfaces of the housings 202 include the intumescent material 230, as described above. The paper dispensing system 200 can include more or less housings 202 than shown.

Further, the disclosure comprises examples according to the following clauses:

Clause 1. A paper dispensing system comprising:
one or more housings defining an internal chamber configured to retain a roll of wound paper, wherein the one or more housings comprises internal surfaces, and an opening through which an edge of the wound paper is dispensable; and
an intumescent material coupled to the one or more housings, wherein the intumescent material is configured to expand to fill and close open areas including the opening within the one or more housings in response to being exposed to a predetermined temperature.

Clause 2. The paper dispensing system of Clause 1, wherein the intumescent material covers at least a portion of the internal surfaces.

Clause 3. The paper dispensing system of Clauses 1 or 2, wherein the intumescent material covers an entirety of the internal surfaces.

Clause 4. The paper dispensing system of any of Clauses 1-3, wherein the paper dispensing system is disposed within an internal cabin of a vehicle.

Clause 5. The paper dispensing system of Clause 4, wherein the paper dispensing system is within a lavatory or a galley of the internal cabin.

Clause 6. The paper dispensing system of any of Clauses 1-5, wherein the wound paper is configured to be manually dispensed.

Clause 7. The paper dispensing system of any of Clauses 1-6, wherein the wound paper is configured to be automatically dispensed.

Clause 8. The paper dispensing system of any of Clauses 1-7, wherein the one or more housings comprises:
  a base;
  one or more walls extending from the base; and
  a door moveably coupled to the one or more walls, wherein the door is moveable between a closed position, and an open position, and wherein the intumescent material is coupled to the base, the one or more walls, and the door.

Clause 9. The paper dispensing system of any of Clauses 1-8, wherein the intumescent material coats the internal surfaces of the one or more housings.

Clause 10. The paper dispensing system of any of Clauses 1-9, wherein the one or more housings is integrally formed with the intumescent material.

Clause 11. The paper dispensing system of any of Clauses 1-10, wherein the one or more housings comprise two or more housings.

Clause 12. The paper dispensing system of Clause 11, further comprising a cabinet, wherein the two or more housings are disposed within the cabinet.

Clause 13. A vehicle comprising:
  an internal cabin; and
  a paper dispensing system disposed within the internal cabin, the paper dispensing system comprising:
    one or more housings defining an internal chamber configured to retain a roll of wound paper, wherein the one or more housings comprises internal surfaces, and an opening through which an edge of the wound paper is dispensable; and
    an intumescent material coupled to the one or more housings, wherein the intumescent material is configured to expand to fill and close open areas including the opening within the one or more housings in response to being exposed to a predetermined temperature.

Clause 14. The vehicle of Clause 13, wherein the intumescent material covers an entirety of the internal surfaces.

Clause 15. The vehicle of Clauses 13 or 14, wherein the paper dispensing system is within a lavatory or a galley of the internal cabin.

Clause 16. The vehicle of any of Clauses 13-15, wherein the wound paper is configured to be automatically dispensed.

Clause 17. The vehicle of any of Clauses 13-16, wherein the one or more housings comprises:
  a base;
  one or more walls extending from the base; and
  a door moveably coupled to the one or more walls, wherein the door is moveable between a closed position, and an open position, and wherein the intumescent material is coupled to the base, the one or more walls, and the door.

Clause 18. The vehicle of any of Clauses 13-17, wherein the one or more housings comprise two or more housings.

Clause 19. The vehicle of Clause 18, wherein the paper dispensing system further comprises a cabinet, and wherein the two or more housings are disposed within the cabinet.

Clause 20. A paper dispensing method comprising:
  coupling an intumescent material to one or more housings defining an internal chamber configured to retain a roll of wound paper, wherein the one or more housings comprises internal surfaces, and an opening through which an edge of the wound paper is dispensable, and wherein the intumescent material is configured to expand to fill and close open areas including the opening within the one or more housings in response to being exposed to a predetermined temperature.

As described herein, examples of the present disclosure provide systems and methods for effectively and efficiently suppressing fire within a paper dispenser. Further, examples of the present disclosure provide fire-suppressing paper dispensing systems and methods that meet various fire containment requirements within a commercial aircraft.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A paper dispensing system comprising:
one or more housings defining an internal chamber configured to retain a roll of wound paper, wherein the one or more housings comprises internal surfaces, and an opening through which an edge of the wound paper is dispensable; and
an intumescent material coupled to the one or more housings, wherein the intumescent material is configured to expand to fill and close open areas including the opening within the one or more housings in response to being exposed to a predetermined temperature.

2. The paper dispensing system of claim 1, wherein the intumescent material covers at least a portion of the internal surfaces.

3. The paper dispensing system of claim 1, wherein the intumescent material covers an entirety of the internal surfaces.

4. The paper dispensing system of claim 1, wherein the paper dispensing system is disposed within an internal cabin of a vehicle.

5. The paper dispensing system of claim 4, wherein the paper dispensing system is within a lavatory or a galley of the internal cabin.

6. The paper dispensing system of claim 1, wherein the wound paper is configured to be manually dispensed.

7. The paper dispensing system of claim 1, wherein the wound paper is configured to be automatically dispensed.

8. The paper dispensing system of claim 1, wherein the one or more housings comprises:
a base;
one or more walls extending from the base; and
a door moveably coupled to the one or more walls, wherein the door is moveable between a closed position, and an open position, and wherein the intumescent material is coupled to the base, the one or more walls, and the door.

9. The paper dispensing system of claim 1, wherein the intumescent material coats the internal surfaces of the one or more housings.

10. The paper dispensing system of claim 1, wherein the one or more housings is integrally formed with the intumescent material.

11. The paper dispensing system of claim 1, wherein the one or more housings comprise two or more housings.

12. The paper dispensing system of claim 11, further comprising a cabinet, wherein the two or more housings are disposed within the cabinet.

13. A vehicle comprising:
an internal cabin; and
a paper dispensing system disposed within the internal cabin, the paper dispensing system comprising:
one or more housings defining an internal chamber configured to retain a roll of wound paper, wherein the one or more housings comprises internal surfaces, and an opening through which an edge of the wound paper is dispensable; and
an intumescent material coupled to the one or more housings, wherein the intumescent material is configured to expand to fill and close open areas including the opening within the one or more housings in response to being exposed to a predetermined temperature.

14. The vehicle of claim 13, wherein the intumescent material covers an entirety of the internal surfaces.

15. The vehicle of claim 13, wherein the paper dispensing system is within a lavatory or a galley of the internal cabin.

16. The vehicle of claim 13, wherein the wound paper is configured to be automatically dispensed.

17. The vehicle of claim 13, wherein the one or more housings comprises:
a base;
one or more walls extending from the base; and
a door moveably coupled to the one or more walls, wherein the door is moveable between a closed position, and an open position, and wherein the intumescent material is coupled to the base, the one or more walls, and the door.

18. The vehicle of claim 13, wherein the one or more housings comprise two or more housings.

19. The vehicle of claim 18, wherein the paper dispensing system further comprises a cabinet, and wherein the two or more housings are disposed within the cabinet.

20. A paper dispensing method comprising:
coupling an intumescent material to one or more housings defining an internal chamber configured to retain a roll of wound paper, wherein the one or more housings comprises internal surfaces, and an opening through which an edge of the wound paper is dispensable, and wherein the intumescent material is configured to expand to fill and close open areas including the opening within the one or more housings in response to being exposed to a predetermined temperature.

* * * * *